(12) United States Patent
Barvosa-Carter et al.

(10) Patent No.: US 7,264,271 B2
(45) Date of Patent: Sep. 4, 2007

(54) REVERSIBLY DEPLOYABLE ENERGY ABSORBING ASSEMBLY AND METHODS FOR OPERATING THE SAME

(75) Inventors: William Barvosa-Carter, Ventura, CA (US); Nancy L. Johnson, Northville, MI (US); Alan L. Browne, Grosse Pointe, MI (US); Guillermo A. Herrera, Winnetka, CA (US); Geoffrey P. Mc Knight, Los Angeles, CA (US)

(73) Assignee: General Motors Corporation, Detroit, MI (US)

( * ) Notice: Subject to any disclaimer, the term of this patent is extended or adjusted under 35 U.S.C. 154(b) by 312 days.

(21) Appl. No.: 10/918,654

(22) Filed: Aug. 13, 2004

(65) Prior Publication Data

US 2006/0033312 A1    Feb. 16, 2006

(51) Int. Cl.
*B60R 21/04* (2006.01)
*B60R 21/207* (2006.01)

(52) U.S. Cl. ............ 280/751; 280/742; 280/752; 280/753; 296/187.05; 297/216.1; 297/284.6

(58) Field of Classification Search .......... 280/739, 280/742, 751, 752, 753; 293/107, 110; 297/216.1, 297/216.12, 216.13, 284.6; 296/187.05
See application file for complete search history.

(56) References Cited

U.S. PATENT DOCUMENTS

| | | | |
|---|---|---|---|
| 3,807,754 A | 4/1974 | Rodenbach et al. | |
| 4,130,298 A | 12/1978 | Shaunnessey | |
| 4,834,322 A | 5/1989 | Wurst | |
| 4,865,388 A * | 9/1989 | Nemoto | 297/403 |
| 5,062,662 A | 11/1991 | Cameron | |
| 5,098,124 A * | 3/1992 | Breed et al. | 280/751 |
| 5,106,137 A * | 4/1992 | Curtis | 293/107 |
| 5,141,279 A * | 8/1992 | Weller | 296/146.7 |
| 5,356,177 A * | 10/1994 | Weller | 280/751 |
| 5,382,051 A * | 1/1995 | Glance | 280/751 |
| 5,427,331 A | 6/1995 | Stroud | |
| 5,468,013 A | 11/1995 | Gille | |
| 5,544,913 A | 8/1996 | Yamanishi et al. | |
| 5,727,391 A | 3/1998 | Hayward et al. | |
| 5,904,370 A | 5/1999 | Steiner et al. | |
| 5,967,594 A * | 10/1999 | Ramanujam | 296/153 |
| 6,158,766 A | 12/2000 | Kowalski | |
| 6,170,871 B1 | 1/2001 | Goestenkors et al. | |
| 6,203,105 B1 | 3/2001 | Rhodes, Jr. | |
| 6,209,908 B1 * | 4/2001 | Zumpano | 280/729 |
| 6,213,502 B1 | 4/2001 | Ryan et al. | |

(Continued)

FOREIGN PATENT DOCUMENTS

JP    H 4-76274    3/1992

(Continued)

*Primary Examiner*—Paul N. Dickson
*Assistant Examiner*—George D. Spisich

(57) ABSTRACT

A reversibly deployable energy absorbing assembly includes a rigid support structure having at least one inlet and at least one outlet; a flexible covering sealingly engaged with the rigid support structure to define an inflatable interior region; a gas source in fluid communication with the at least one inlet; an inlet control valve positioned intermediate the gas source and the at least one inlet; and an actively controlled pressure relief valve in fluid communication with the at least one outlet. The inlet control valve and the pressure relief valve are adapted to provide a response suitable for use in vehicle impact management.

15 Claims, 3 Drawing Sheets

U.S. PATENT DOCUMENTS 6,231,077 B1 * 5/2001 Karolek et al. ............. 280/735
6,352,281 B1    3/2002 Buss
6,474,733 B1 * 11/2002 Heilig et al. ........... 297/216.12
6,497,183 B2 * 12/2002 Demarquilly et al. .... 105/392.5
6,550,807 B1    4/2003 Faigle et al.
6,899,134 B2 * 5/2005 Breed et al. ........... 137/625.31
6,910,714 B2 * 6/2005 Browne et al. ............. 280/753
2003/0075223 A1 4/2003 Breed et al.

FOREIGN PATENT DOCUMENTS

JP    H 7-42893    2/1995

* cited by examiner

REVERSIBLY DEPLOYABLE ENERGY ABSORBING ASSEMBLY AND METHODS FOR OPERATING THE SAME

BACKGROUND

This disclosure relates to an energy absorbing assembly and more particularly, to a reversibly deployable energy absorbing assembly adapted to provide a controllable level of energy adsorption and/or a controllable/tunable level of contact and/or stroking force in response to an activation signal.

It is known in the prior art to provide various types of personal protection by the use of energy-absorbing devices, such as in helmets, vehicles, and the like. These products are generally designed to absorb a significant percentage of the energy from an impact while providing appropriate levels of contact force. Within the vehicle, for example, various types of occupant protection devices may be employed for impact with structural body components such as door pillars, frames, headrails, and the like. These components are typically made of steel tubing or steel channels that are welded together to form the structural cage or unitized body for the vehicle and may themselves absorb energy as the result of an impact. In addition, energy absorbers may also be placed over the door pillars, frames, headrails, and other parts of the vehicle to further protect the vehicle occupants during an impact event. Prior art approaches generally have used irreversibly crushable materials, such as metal, plastics or foams, irreversible air inflation devices, e.g. air bags and inflatable side curtains, rigid translation devices, e.g., extendable/retractable knee bolsters, and devices that can change the stroking forces, e.g., magnetorheological material based dampers.

BRIEF SUMMARY

Disclosed herein is an interior vehicle surface comprising an energy absorbing assembly comprising a rigid support structure having at least one inlet and at least one outlet; a flexible covering sealingly engaged with the rigid support structure to define an reversibly expandable interior region; a gas source in fluid communication with the at least one inlet; an inlet control valve positioned intermediate the gas source and the at least one inlet, wherein the inlet control valve is a binary valve and is adapted to responsively open and close the valve within 0.1 millisecond; and an actively controlled pressure relief valve in variable controlled fluid communication with the at least one outlet.

In another embodiment, the interior vehicle surface comprises an energy absorbing assembly comprising a rigid support structure having at least one inlet and at least one outlet; a flexible covering sealingly engaged with the rigid support structure to define a reversibly expandable interior region; a gas source in fluid communication with the at least one inlet; an inlet control valve positioned intermediate the gas source and the at least one inlet, wherein the inlet control valve is a continuously variable valve and is adapted to responsively open and close the valve within 1 millisecond; and an actively controlled pressure relief valve in fluid communication with the at least one outlet.

In yet another embodiment, an interior vehicle surface comprises an energy absorbing assembly comprising a rigid support structure; a flexible covering sealingly engaged with the rigid support structure to define an expandable interior region; an energy absorbing material disposed in the interior region; a bimorph actuator intermediate the rigid support structure and the energy absorbing material, wherein the bimorph actuator comprises a flexible strip and a piezoelectric material disposed on a portion of the strip; and an actuator in electrical communication with the bimorph actuator.

A method of operating an energy absorbing assembly comprises attaching the energy absorbing assembly to a rigid support structure, wherein the energy absorbing assembly comprises a flexible cover sealing engaged with the rigid support structure to form a reversibly expandable interior region; at least one inlet and at least one outlet in fluid communication with the interior region; an inlet control valve in fluid communication with the at least one inlet; an outlet pressure relief valve in fluid communication with the at least one outlet; and a gas source in fluid communication with the inlet control valve; sensing or predicting an impact of an object providing an activation signal to the inlet control valve to open fluid communication between the gas source and the interior region; inflating the interior region to an inflated position within about 20 milliseconds; and closing the inlet control valve and opening the pressure relief valve to deflate the interior region to a predetermined pressure.

In another embodiment, a method of operating an energy absorbing assembly comprises attaching the energy absorbing assembly to a rigid support structure, wherein the energy absorbing assembly comprises a flexible cover sealing engaged with the rigid support structure to form an expandable interior region; an energy absorbing material disposed in the interior region; a bimorph actuator intermediate the rigid support structure and the energy absorbing material, wherein the bimorph actuator comprises a flexible strip or sheet and a piezoelectric material disposed on a portion of the strip; and an actuator in electrical communication with the bimorph actuator; sensing or predicting an impact of an object; and providing an activation signal to the bimorph actuator and change a shape orientation of the flexible strip from a substantially planar configuration to a non-planar configuration.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are reversibly deployable tunable force level energy absorbing assemblies for use in vehicle interior impact management that are adapted to provide a controllable level of energy adsorption and/or a controllable/tunable level of contact and/or stroking force in response to an activation signal. The energy absorbing assemblies include an air inflation mechanism that can be rapidly and reversibly deployed to provide an expanded configuration to a vehicle surface so as to absorb impact energy. The air inflation mechanism utilizes actively controlled valves that provide actively designed release, or passively designed release of a gas that initially caused the expansion.

Figure 1:
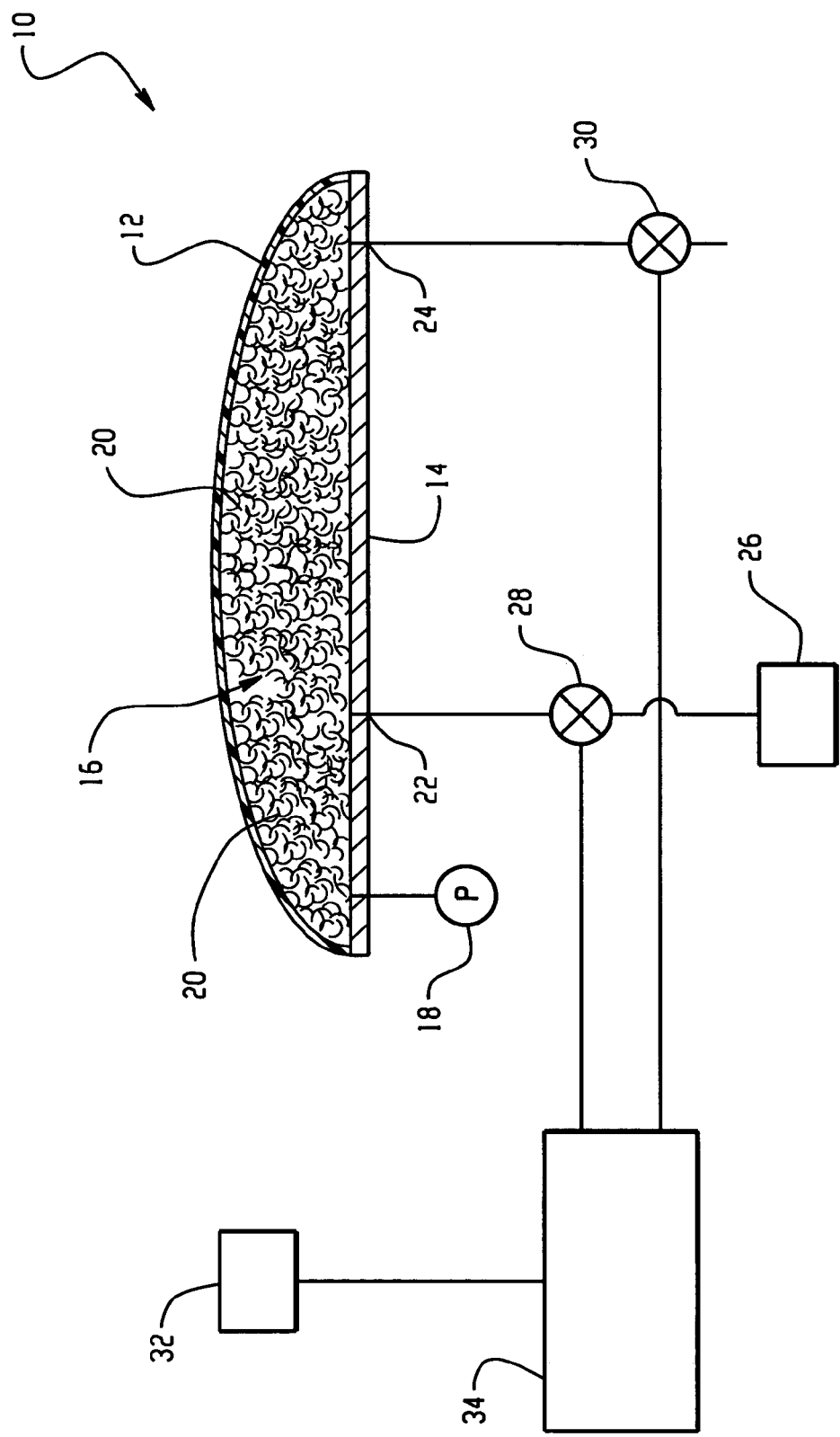
FIG. 1 is schematic illustrating an energy absorbing assembly in accordance with the present disclosure.

As shown in FIG. 1, a reversible energy absorbing assembly in accordance with one embodiment, generally indicated as 10, comprises a flexible covering 12 in sealing communication with a rigid support structure 14. The flexible covering 12 and the rigid support structure 14 define a gas inflatable interior region 16, which is preferably in operative communication with a pressure sensor 18. Optionally, an energy absorbent material 20 is disposed within the interior region 16 to provide a secondary means for impact energy absorption. Suitable energy absorbent materials 20 include foams, felt, fabric, rubber, and other like resilient materials. Various materials contemplated include, but are not intended to be limited to, open celled structures, closed celled structures, lattice structures, porous structures, and the like.

The rigid support structure 14 includes at least one inlet opening 22 and at least one outlet opening 24. A gas source 26 is in fluid communication with the at least one inlet opening 22. An actively controlled valve 28 controls flow of gas from the gas source 26 into the interior region 16. The at least one outlet opening 24 is in fluid communication with an actively controlled pressure relief valve 30, which, in combination or singly, can adjust gas pressure within the interior region 16. In its intended use for impact management, the actively controlled valves 28, 30 preferably respond from an opened position to a closed position (or vice versa) within 10 milliseconds (msec), and more preferably within 1 millisecond if continuously variable. If the actively controlled valves are configured to be binary, it is preferred that the valves respond within about 1 msec, and more preferably within about 0.1 msec. During operation, the interior region 16 is filled with gas causing the flexible covering 12 to expand. For impact management, it is preferred that the expansion time be relatively rapid with an expansion time of less than about 5 msec preferred, wherein a volume expansion of the interior region is on the order of about 50 to about 200 percent.

The energy absorbing assembly 10 further comprises a sensor 32 and a controller 34 in operative communication with the actively controlled valves 28, 30, and the pressure sensor 18 for inflating the interior region 16 in response to an activation signal provided by the sensor 32 to the controller 34. The controller may further include other input means such as data indicating whether the occupant is restrained or not, as well as other anthropometry related inputs.

The sensor 32 is preferably configured to provide vehicle pre-impact information to the controller 34, which then actuates the energy absorbing assembly 10 under pre-programmed conditions defined by an algorithm or the like. In this manner, the system 10 can be used to anticipate an event such as a vehicle impact and the possibility of a subsequent attendant impact of an occupant against the device. The system anticipates by deploying the device and tuning its stiffness/energy absorption properties based on factors such as occupant anthropometrics, impact velocity, restraints, and the like. In the event a subsequent impact is not realized, the energy absorbing assembly is deflated and returns the energy absorbing assembly back to its original shape and configuration, if programmed in this manner. Opening pressure relief valve 30 while simultaneously closing valve 28 can effect deflation. The illustrated energy absorbing assembly 10 is exemplary only and is not intended to be limited to any particular shape, size, configuration, or the like. Moreover, the programming of the controller 34 is well within the skill of those in the art and can be programmed for a variety of impact scenarios as will be appreciated by those skilled in the art in view of this disclosure.

The flexible covering 12 is preferably fabricated from a material that is elastic (flexible) to the limits of the assembly expansion so that it can return to its original geometry, as desired. As such, suitable materials include elastomers such as styrene butadiene rubber, polyurethanes, polyisoprene, neoprene, chlorosulfonated polystyrenes, and the like. Other materials suitable for use as a flexible cover 12 will be apparent to those skilled in the art in view of this disclosure. Preferably, the material chosen for the flexible cover accommodates reversible strains of at least 50 percent, with about 100 percent more preferred, with about 200 to 400 percent even more preferred. Also, it is preferred that the flexible covering be fabricated from a material capable of maintaining a pressure of about 20 to about 100 pounds per square inch (psi) under a variety of loading conditions. The flexible covering 12 can be decoratively patterned or, optionally, a separate outer decorative covering (not shown) can be provided in sliding engagement over the flexible covering 12, e.g., a stretchable fabric or the like.

Figure 2:
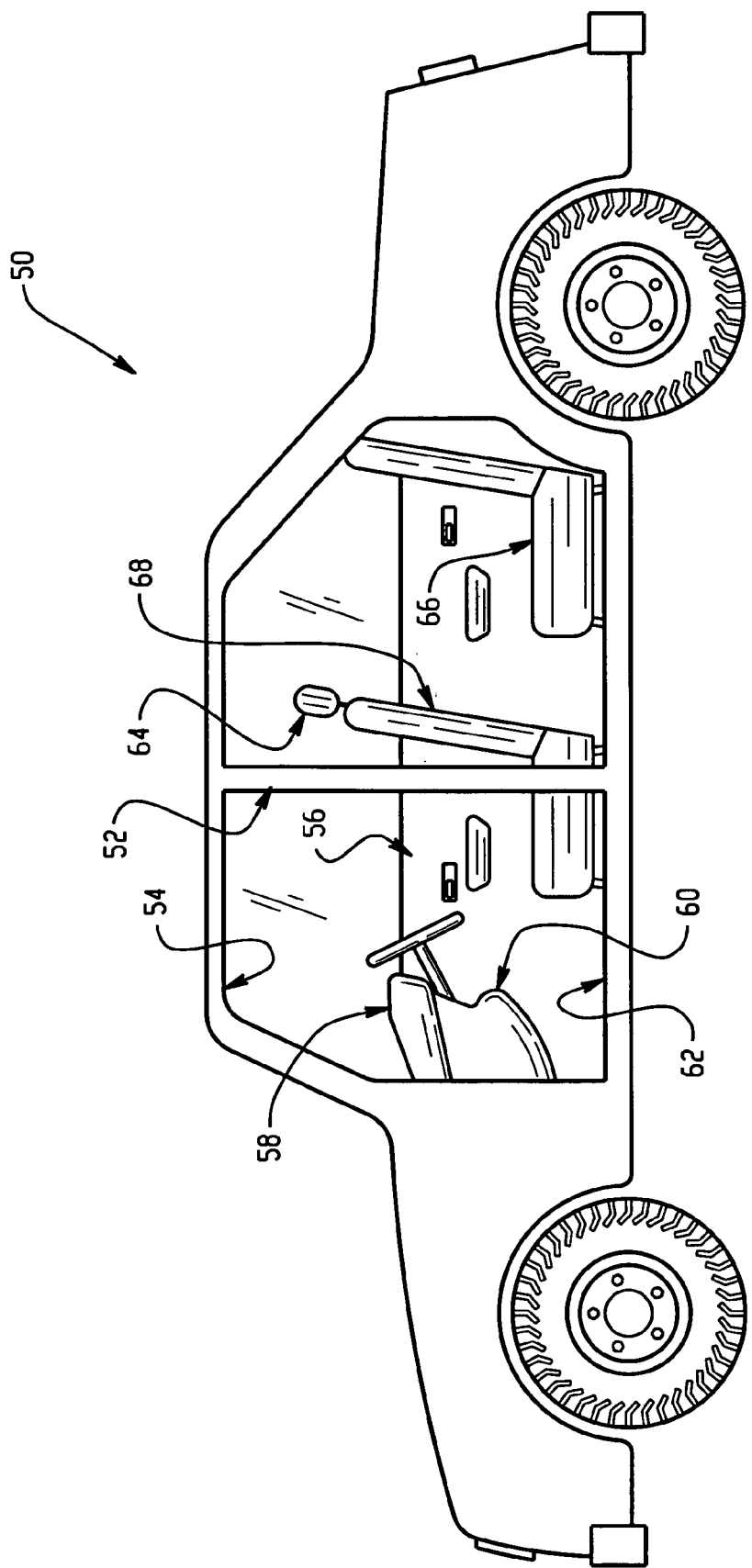
FIG. 2 is a side perspective view of a vehicle illustrating various support structures suitable for employing the energy absorbing assembly.

The rigid support structure 14 is preferably a stationary support for an interior surface of a vehicle. More preferably, the rigid support structure 14 employed in the energy absorbing assembly supports those interior vehicle surfaces. FIG. 2 illustrate various uses of the energy absorbing assembly 10 in a vehicle environment. The energy absorbing assembly 10 can be used to replace conventional padded interior surfaces in the vehicle 50. For example, the energy absorbing assembly 10 can be used for the door pillars 52, the header 54, the door interiors 56, the dashboard 58, the sun visors, the armrests, the knee bolsters 60, and other areas such as under the carpet on the vehicle floor 62, in the headrest 64 of the seat, the seat 66 itself, the seat backs 68, or like surfaces where absorption of kinetic energy caused by impact of an occupant with the surface is desired and/or proper positioning of the occupant is desired during an impact. For example, locating the energy absorbing assembly under the carpet can be used to assist the positioning of an occupant's knees with respect to the knee bolster. In the seat area, the energy absorbing assembly can be strategically positioned to provide stiffening at an edge of the seat 66 to provide anti-submarining properties and help keep an occupant from sliding forward in the event of an impact. Other areas of the vehicle, such as the door pillars, can provide energy absorption properties to the occupant in the event of the impact, thereby decreasing the forces associated with an impact to the occupant.

Optionally, the reversibly expandable interior region 16 provided by the flexible covering 12 and the rigid structure 14 may comprise multiple sealed compartments (i.e., quilt like), wherein each sealed compartment includes the gas inlet and outlet as previously described. In this manner, the system advantageously provides redundancy, thereby preventing complete system failure due to puncture of one of the interior regions, malfunction of the valves, and other like failures.

The actively controlled valve 28 and the actively controlled pressure relief valve 30 may be a solenoid driven valve or may be a piezoelectric valve or a valve based on other active materials well suited as actuators, preferably those actuated with applied electric or magnetic fields, e.g., electroactive polymers, ferromagnetics, piezoelectrics, and the like. For example, an electroactive polymer actuated valve, an electrorheological actuated valve, a magnetorheological actuated valve, and a magnetic shape memory alloy actuated valve. Other suitable valves are thermally activated such as those actuators based on shape memory alloys and shape memory polymers, for example. Preferably, the valves 28, 30 are selected to provide actuation times of less than 1 msec and are preferably configured for actuation by direct current. The actuation of the valves can be variable or binary. Suitable solenoid valves and piezoelectric valves are commercially known in the art. For exemplary purposes, a suitable piezoelectric valve can be obtained commercially available from Maxtek, Inc. under the trade name MV112. In a preferred embodiment, the valves 28, 30 and pressure sensor 18 are placed within the frame of the vehicle, occupying space which is either currently empty, or taken up by current passenger impact safety structures. Likewise, the controller 34 and gas source 26 occupy space that is either currently empty or integrated with other components already existing found in the vehicle.

In an alternative embodiment, the relief valve 30 comprises an actively controlled valve. In this manner, pressure within the interior region is tunable and rapid relief is possible. In a preferred embodiment, the relief valve 30 is actuated faster than the inlet valve to provide further tunable capabilities for variably controlling the stroking/damping capabilities of the energy absorbing assembly.

The gas source 26 may be stored in the vehicle in a compressed gas container, may be obtained from an accumulator, or may be obtained by a pyrotechnic device as is know in the art. Suitable gases include inert gases, air, and the like. Preferably, the gas is non-flammable.

In operation, once a crash event has been detected by sensor 32, the gas inlet pressure valve 28 is opened causing gas to flow into the reversibly expandable interior region 16 and expand the flexible covering 12, as indicated by the dotted lines in FIG. 1. Depending on the design, the gas inlet pressure valve 28 may be continuously variable or binary in response. The pressure sensor 18 monitors the force of the deployment, which is fed back to the controller 34. Expansion continues until the backpressure within the interior region 16 reaches a predetermined pressure (preferably at about 20 to about 100 psi based on sensor inputs as well as various other anthropometric inputs as discussed above) at which time gas flow into the interior region 16 is discontinued or pressure relief valve 30 opens to maintain the predetermined pressure or opens to provide controlled deflation of the interior region. If the pressure is greater than the predetermined pressure, it may indicate that the system is compromised with an obstruction or an object is preventing expansion or that the pressure relief valve 30 has failed or the like. In this case, a feedback loop to valve 28 closes the valve or alternatively, controls the valve 28 such that the internal pressure in the interior region 16 is maintained at about the predetermined or desired pressure.

Once the energy absorbing assembly is inflated, the pressure is continuously monitored. Any object impacting the assembly must experience a force that is below a critical force value as programmed by the controller 34. This is achieved variously depending on the nature of the control valve 28. If the valve is continuously variable or has a number of discrete positions greater than 2 (greater than off/on), the pressure within the interior region can be maintained by directly feeding the pressure information back to the release valve 30 by means of a closed loop. If the valve is binary, i.e., only two positions, then faster control must be implemented to open and close the valves 28, 30 in digital fashion to maintain the pressure within the assembly between predetermined limits. In this embodiment, it is preferred that the relief valve 30 has faster actuation times than the inlet valve 28.

As determined by the vehicle impact sensor system, it is possible that a false detect of an impending impact occurred. In this case, the energy absorbing assembly 10 can be reset by opening of the gas release valve 30 fully and allowing the force of the flexible covering 12 to expel all gas. In this configuration, the assembly 10 reverts to its original configuration. Advantageously, since the system is reversible, deflation does not impact interior aesthetics.

The energy absorbing assembly 10 can be applied to any rigid support structure 14 wherein it is desired to provide a reduction in kinetic energy associated with an occupant or object impacting the support structure and/or for proper positioning of the occupant. As such, the system is extremely versatile. Moreover, the use of the solenoid actuator and/or a piezoelectric or other active material based actuators provides shorter expansion times, which are desired for effective impact management. Because of the short expansion times, this type of energy absorbing assembly is particularly well suited for use with crash detection systems using crash detection means plus algorithms to trigger deployment, i.e., systems similar to that used in conventional airbag restraint systems as will be appreciated by those skilled in the art. Restoration of the device to it original geometry would have no such requirement for rapid action and thus could be effectively managed by simple contraction of the flexible covering 12 to its relaxed state.

Figure 3:
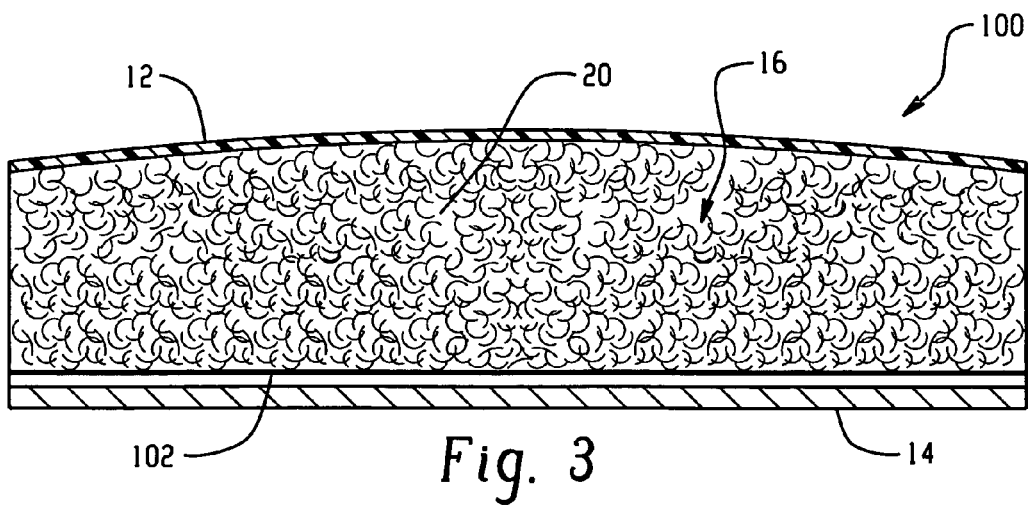
FIG. 3 is a cross sectional view of an energy absorbing assembly in accordance with another embodiment.
Figure 4:
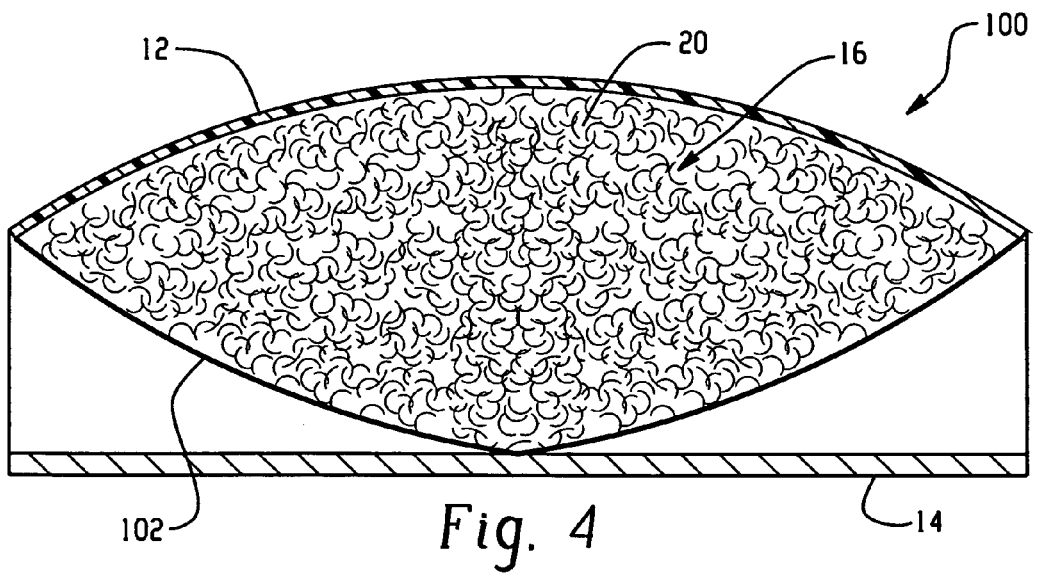
FIG. 4 is a cross sectional view of the energy absorbing assembly of FIG. 3 in a deployed configuration.

In an alternative embodiment, an energy absorbing assembly 100 for use in vehicle interior impact management that can be rapidly and reversibly deployed to an expanded configuration so as to absorb impact energy includes a bimorph actuator 102 that is preferably based on an active material, e.g., piezoelectric ceramics, and the like. The bimorph actuator provides a means for soft deployment in contrast to the hard deploy provided by the inflation means of energy absorbing assembly 10, discussed above. As shown more clearly in FIGS. 3 and 4, the energy absorbing assembly 100 includes the flexible covering 12 in sealing communication with the rigid support structure 14. The controller and the sensor are as shown in FIG. 1. The flexible covering 12 and the rigid support structure 14 define the reversibly expandable interior region 16. The energy absorbent material 20 is disposed within the interior region 16 intermediate the bimorph actuator 102 and the flexible covering 12, wherein the bimorph actuator 102 is disposed intermediate the rigid support structure 14 and the interior region 16. Activation of the bimorph actuator 102 causes expansion of the interior region and further provides damping capabilities. The bimorph actuator 102 can be configured to provide a concave or convex shape to provide the expansion. Optionally, the bimorph actuator 102 can be employed in combination with the air inflation mechanism as shown in and discussed in relation to FIG. 1. Moreover, it may be desired to provide an air inlet and outlet so as to allow maximum expansion of the bimorph actuator.

Figure 5:
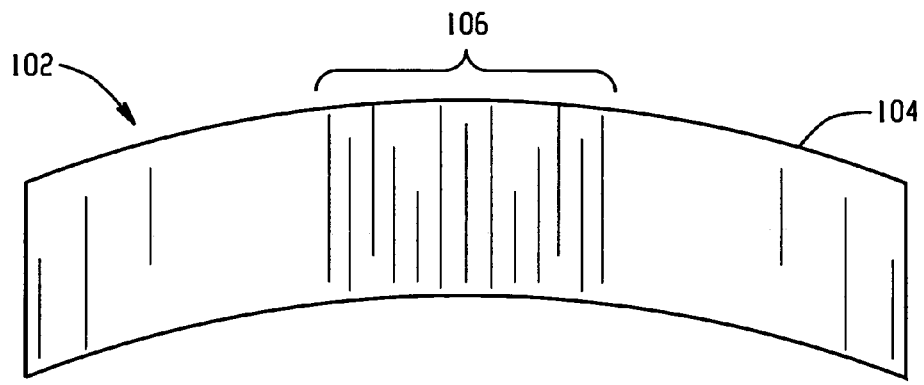
FIG. 5 is a perspective view of a bimorph actuator in an activated configuration.

FIG. 5 illustrates an exemplary bimorph actuator 102. The actuator preferably comprises a flexible strip 104 and a piezoelectric material 106 disposed on selected portions of a surface of the flexible strip 104 to provide a shape changing capability to the actuator strip 102. Upon receipt of an activation signal, the bimorph actuator 102 will bend at those portions of the flexible strip 104 having the piezoelectric material 106. The piezoelectric material expands (or contracts) upon receipt of the activation signal causing the flexible strip to bend. As such, the degree of bending and the orientation of the bend along the flexible strip can be readily manipulated by the placement of the piezoelectric material 106 and the applied current as well as the thicknesses of the materials employed and the physical properties thereof. For example, centrally depositing or affixing the piezoelectric material 106 onto the flexible strip 104 will result in a clam shell shape orientation upon receipt of a suitable activation signal as shown.

The piezoelectric bimorph clamshell configuration is exemplary only and is not intended to be limited to any particular shape, size, or the like. Other shapes may be desirable for providing various soft deployment configurations. For example, the thickness of the piezoelectric material can be adjusted in accordance with the operation and position of the piezoelectric material. In general, as the piezoelectric material layer becomes thinner, the greater the distortion it must undergo. Upon actuation, the piezoelectric material 106 contracts (or expands) and is positioned to force the energy absorbent material 20 away from the rigid structure 14 to increase kinetic energy absorption of an object or occupant upon contact therewith. The degree of force exerted upon the energy absorbent material 20 is greatest at the ends of the flexible strip 104. Advantageously, the so-flexed strip 104 provides increased damping properties in combination with pressurized air.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An interior vehicle surface assembly, comprising:
an energy absorbing assembly comprising a rigid support structure having at least one inlet and at least one outlet; a flexible covering that defines an interior vehicle surface sealingly engaged with the rigid support structure to form an expandable interior region, wherein the interior vehicle surface is configured to inflatably and flexibly expand outward relative to the rigid support structure; a gas source in fluid communication with the at least one inlet; an inlet control valve positioned intermediate the gas source and the at least one inlet, wherein the inlet control valve is a binary valve and is adapted to responsively open and close the valve within 1 millisecond; and an actively controlled pressure relief valve in variable controlled fluid communication with the at least one outlet.

2. The interior vehicle surface of claim 1, wherein the energy absorbing assembly forms a door pillar surface, a headrest surface, a floor surface, a seat surface, a dashboard surface, a steering wheel surface, a door surface, a ceiling surface, or a combination comprising at least one of the foregoing interior vehicle surfaces.

3. The interior vehicle surface of claim 1, wherein the inlet control valve and the relief valve are valves selected from the group consisting of a piezoelectric valve, a solenoid valve, and an active material based valve.

4. The interior vehicle surface of claim 1, wherein the actively controlled pressure relief valve is adapted to responsively open and close faster than the inlet control valve.

5. The interior vehicle surface of claim 1, further comprising a controller in operative communication with a pressure sensor, the inlet control valve, and the actively controlled pressure relief valve; and a sensor in electrical communication with the controller configured to sense or predict an impact event.

6. An interior vehicle surface assembly, comprising:
an energy absorbing assembly comprising a rigid support structure having at least one inlet and at least one outlet; a flexible covering that defines an interior vehicle surface sealingly engaged with the rigid support structure to form an expandable interior region, wherein the interior vehicle surface is configured to inflatably and flexibly expand outward relative to the rigid support structure; a gas source in fluid communication with the at least one inlet; an inlet control valve positioned intermediate the gas source and the at least one inlet, wherein the inlet control valve is a continuously variable valve and is adapted to responsively open and close the valve within 1 millisecond; and an actively controlled pressure relief valve in fluid communication with the at least one outlet.

7. The interior vehicle surface of claim 6, wherein the energy absorbing assembly forms a door pillar surface, a headrest surface, a floor surface, a seat surface, a dashboard surface, a steering wheel surface, a door surface, a ceiling surface, or a combination comprising at least one of the foregoing interior vehicle surfaces.

8. The interior vehicle surface of claim 6, wherein the inlet control valve and the relief valve are valves selected from the group consisting of a piezoelectric valve, a solenoid valve, and an active material based valve.

9. The interior vehicle surface of claim 6, wherein the actively controlled pressure relief valve is adapted to responsively open and close faster than the inlet control valve.

10. The interior vehicle surface of claim 6, further comprising a controller in operative communication with a pressure sensor, the inlet control valve, and the actively controlled pressure relief valve; and a sensor in electrical communication with the controller.

11. A method of operating an energy absorbing assembly, comprising:
 sensing or predicting an impact of an object;
 providing an activation signal to an energy absorbing assembly attached to a rigid support structure, wherein the energy absorbing assembly comprises a flexible cover that defines an interior vehicle surface that is sealingly engaged with the rigid support structure to form an expandable interior region; at least one inlet and at least one outlet in fluid communication with the interior region; an inlet control valve in fluid communication with the at least one inlet; an outlet pressure relief valve in fluid communication with the at least one outlet; and a gas source in fluid communication with the inlet control valve; and a pressure sensor in operative communication with the expandable interior region and configured to monitor a pressure within the expandable interior region; wherein the activation signal signals the inlet control valve to open fluid communication between the gas source and the interior region;
 inflating the interior region to an inflated position within about 20 milliseconds, wherein inflating the interior region comprises outwardly expanding the interior vehicle surface relative to the rigid support structure; and
 closing a selected one or both of the inlet control valve and opening the pressure relief valve to decrease or maintain a pressure of the interior region.

12. The method of operating the energy absorbing assembly of claim 11, wherein the inlet control valve and the pressure relief valve are valves selected from the group consisting of a solenoid valve, a piezoelectric actuated valve, electroactive polymer actuated valve, an electrorheological actuated valve, a magnetorheological actuated valve, and a magnetic shape memory alloy actuated valve.

13. The method of operating the energy absorbing assembly of claim 11, wherein the inlet control valve is a binary valve and is fully opened within 1 millisecond.

14. The method of operating the energy absorbing assembly of claim 11, wherein the inlet control valve is a continuously variable valve and is fully opened within 10 milliseconds.

15. The method of operating the energy absorbing assembly of claim 11, further comprising inflating and deflating the interior region at least one additional time upon the sensing or the predicting of an additional impact event.

* * * * *